US012583288B2

(12) United States Patent
Senn et al.

(10) Patent No.: US 12,583,288 B2
(45) Date of Patent: Mar. 24, 2026

(54) VEHICLE INTERIOR VENTILATION APPARATUS

(71) Applicant: ILLINOIS TOOL WORKS INC., Glenview, IL (US)

(72) Inventors: Andreas Senn, Neuhemsbach (DE); Stefan Jatzke, Ebertsheim (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 508 days.

(21) Appl. No.: 18/065,413

(22) Filed: Dec. 13, 2022

(65) Prior Publication Data

US 2023/0182537 A1 Jun. 15, 2023

(30) Foreign Application Priority Data

Dec. 15, 2021 (DE) ..................... 10 2021 133 310.5

(51) Int. Cl.
B60H 1/24 (2006.01)

(52) U.S. Cl.
CPC ..................................... B60H 1/249 (2013.01)

(58) Field of Classification Search
CPC ...................................................... B60H 1/249
See application file for complete search history.

(56) References Cited

U.S. PATENT DOCUMENTS 8,029,343 B2 * 10/2011 Major ................. H01M 10/615
62/244
9,849,754 B2 * 12/2017 Kim ...................... B60H 1/249

10,639,963 B2 5/2020 Kena
11,186,144 B2 11/2021 Carlson
11,384,854 B1 * 7/2022 Rusch ..................... F16K 21/04
2007/0277884 A1 * 12/2007 Johnson ................... E03D 3/00
137/494
2008/0169672 A1 7/2008 Moccio
2009/0111371 A1 4/2009 Niezur
2013/0072101 A1 3/2013 Marleau, Jr
2013/0267159 A1 * 10/2013 McCarthy ............. B60H 1/249
454/162
2015/0165872 A1 6/2015 Chang
2015/0321540 A1 11/2015 Kim
2017/0282688 A1 10/2017 Mohany
2019/0322157 A1 10/2019 Harris
2020/0086716 A1 3/2020 Carlson
2020/0262270 A1 8/2020 Williams
2020/0338962 A1 * 10/2020 Jatzke ..................... F16K 24/04

FOREIGN PATENT DOCUMENTS

CN 104999893 A 10/2015
DE 3503600 A1 8/1986
DE 102004043237 A1 4/2005
DE 102008008845 A1 9/2008
(Continued)

*Primary Examiner* — Allen R. B. Schult
(74) *Attorney, Agent, or Firm* — THOMPSON HINE LLP

(57) ABSTRACT

A vehicle interior ventilation apparatus having at least one pressure relief valve, in particular of a first type, which is received and/or fixed in a first receiving opening in a vehicle body component, and having at least one pressure relief valve (10), in particular of a second type that differs from the first type, which is received and/or fixed in a second receiving opening separated from the first receiving opening in a vehicle body component.

17 Claims, 10 Drawing Sheets

1

(56)         References Cited

FOREIGN PATENT DOCUMENTS

| | | | |
|----|----------------|----|---------|
| DE | 102008028004 | A1 | 1/2009 |
| DE | 102008049490 | A1 | 5/2009 |
| DE | 202013104675 | U1 | 1/2014 |
| DE | 102013208847 | A1 | 2/2014 |
| DE | 102014204207 | A1 | 9/2014 |
| DE | 202018106267 | U1 | 11/2018 |
| DE | 202018106936 | U1 | 1/2019 |
| DE | 102021133310 | A1 | 6/2023 |
| EP | 2005571 | A2 | 12/2008 |
| EP | 2429850 | A4 | 3/2012 |
| EP | 2567895 | A3 | 3/2013 |
| EP | 2783886 | A4 | 10/2014 |

* cited by examiner

VEHICLE INTERIOR VENTILATION APPARATUS

TECHNICAL FIELD

The present invention relates generally to air ventilation apparatuses for the interior of vehicles, wherein such air ventilation apparatuses are also referred to herein as "pressure relief valve assemblies."

BACKGROUND OF THE INVENTION

Air ventilation apparatuses or pressure relief valve assemblies for the interior of vehicles typically have a frame surrounding a vent opening on which at least one valve lies externally, said valve covering the vent opening and being pivotable away from it.

Such air ventilation apparatuses and pressure relief valve assemblies are generally known in various embodiments. In this context, for example, reference is made to the publication DE 35 03 600 A1.

In the pressure relief valve assembly known from this prior art, an airflow from the interior of the vehicle can pass outwardly via the vent opening, namely in that this airflow lifts the at least one flap of the pressure relief valve assembly away from the frame due to the adjustment of pressure ratios. On the other hand, the ingress of ambient air into the interior of the vehicle through the flap, which is now resting on the frame, is successfully prevented.

Accordingly, pressure relief valve assemblies of the type considered herein serve to reduce the build-up of air pressure in the interior of the vehicle, for example when closing a tailgate of the vehicle. The pressure relief valve, typically configured as a flap, can open at an increased air pressure in the interior of the vehicle in order to allow air to escape within the interior, thereby reducing air pressure in the interior of the vehicle and reducing the effort needed in order to, for example, close the tailgate of the vehicle.

Moreover, a vehicle having a pressure relief valve assembly can influence airflow from the vehicle cabin in order to increase passenger comfort. Because a climate system draws ambient air from outside the vehicle and introduces air into the vehicle cabin, a ventilation through the pressure relief valve assembly is required in order to achieve proper circulation and reduce the pressure build-up.

In vehicles with an electrically operated sliding door, a pressure relief valve assembly is of particular importance. By contrast to hinged doors, when a sliding door is closed, a pressure buildup to be equalized in the interior of the vehicle with the aid of a pressure relief valve assembly occurs abruptly, because, during the closing operation of a sliding door, it is first moved parallel in front of the door opening and then perpendicular to the door opening. The perpendicular movement path is relatively short, so that the positive pressure in the passenger cabin cannot be reduced via the closing door gap. This is especially true for large sliding doors.

Conventionally designed pressure relief valve assemblies are not designed to sufficiently equalize the positive pressure which builds up over a short time during the closing operation of a sliding door in order to significantly simplify the closing operation of the door. In the case of electrically actuated sliding door assemblies, this results in the electromotive actuator having to apply a corresponding amount of power in order to close the sliding door.

Increasing the pressure relief valve assemblies in such vehicles so as to increase the viable airflow rate is not an alternative, because opening the pressure relief valve associated with a pressure relief valve assembly can allow outside noise to penetrate through the opening. There is motivation to execute pressure relief valves as small as possible in order to reduce the ingress of noise and outside elements into the vehicle cabin.

Moreover, pressure relief valve assemblies cannot be arbitrarily integrated in the vehicle body and/or outer skin of the vehicle.

With pressure relief valve assemblies of the type considered herein, it is essential that they be accommodated and mounted securely in a receiving opening of a vehicle body component or outer skin component. This in particular implies the prerequisite that the vehicle body component or the outer skin component be level in the region of the planned pressure relief valve assembly or have a so-called level surface topology so as to ensure that a mounting flange of the pressure relief valve assembly can rest securely on the surface of the vehicle body component on all sides. Otherwise, an effective sealing of the receiving opening provided in the body component for mounting of the pressure relief valve assembly is not implementable.

In particular, it is thus necessary for a pressure relief valve assembly to be inserted in a region of a body component that is designed level as a whole and in particular has no curvatures or edges or corners.

In other words, to mount a pressure relief valve assembly in a vehicle body component, it is necessary that only a relatively large region of the body component that has the required levelness will be considered.

This requirement increasingly poses a problem in automotive design, and in particular in the design of the exterior of vehicles. In particular, automotive designers must meet several expectations.

They must find a functional, ergonomic, and aesthetic shape for the technology. It must embody the company's brand values, such as sportsmanship, comfort, or technological progress. Finally, the design should arouse emotion and thus turn prospective customers into buyers. When buying a car today, vehicle design is one of the most important decision criteria.

However, engineering must also be considered in the design process, as a result of which not all design lines can be implemented, or at least not readily. In the exterior region, this relates among other things to the integration of pressure relief valve assemblies, which—as already stated—require a relatively large and in particular level surface in the vehicle body for installation.

Another aspect is the increased application of sensors, such as spacer radar sensors, in the region of the pressure relief valve assembly that provide greater safety and comfort to vehicle occupants and also limit the space required for the pressure relief valve assembly. These sensors will increasingly be required in future autonomously driving vehicles.

SUMMARY OF THE INVENTION

On the basis of this situation, the invention addresses the problem of providing a solution with which a positive pressure in the vehicle interior can be eliminated as quickly as possible, for example when closing a sliding door, wherein, on the other hand, the pressure relief valve assembly can be optimally mounted in the vehicle body while requiring as little space as possible. In particular, the functionality and capacity of the ventilation are to be increased.

Accordingly, the invention relates in particular to a vehicle interior ventilation apparatus having at least one pressure relief valve, in particular of a first type, which is received and/or fixed in a first receiving opening in a vehicle body component, and having at least one pressure relief valve, in particular of a second type that differs from the first type, which is received and/or fixed in a second receiving opening separated from the first receiving opening in a vehicle body component.

The advantages achievable with the solution according to the invention are clear: by using a plurality of pressure relief valves separately installed in the vehicle body in order to vent the interior of a vehicle as needed, it is generally possible to make the individual pressure relief valves in smaller size without restricting the capacity of the vent. Smaller sized pressure relief valves can be flexibly integrated at various points in the vehicle body, because each individual pressure relief valve requires only a little space.

Furthermore, it is possible to optimally position the pressure relief valves in the vehicle body, for example in the immediate vicinity of a door, in particular a sliding door, or a flap. The pressure build-up in the vehicle interior resulting when the door/flap is closed can thus be equalized particularly quickly.

In particular, pressure relief valves of different types are used in the vehicle interior ventilation apparatus according to the invention. In this way, various situations can be taken into account.

According to implementations of the vehicle interior ventilation apparatus according to the present invention, at least one pressure relief valve of a first type and at least one pressure relief valve of a second type are used, wherein the first pressure relief valve type differs from the second pressure relief valve type in that the at least one pressure relief valve of the first type, in its fully opened state, allows for an airflow rate that differs from an airflow rate that the at least one pressure relief valve of the second type allows in its fully open state.

For example, it is conceivable in this context that a relatively small pressure relief valve (compared to the pressure relief valve of the first type) is used as the pressure relief valve of the second type, thus allowing a lower airflow rate than the pressure relief valve of the first type. Such a smaller sized pressure relief valve can be flexibly integrated into various vehicle body components, and thus in particular also in the immediate vicinity of a door or flap of the vehicle or in the immediate vicinity of an airbag.

Alternatively or additionally, it is conceivable that the first pressure relief valve type differs from the second pressure relief valve type in that the at least one pressure relief valve of the first type opens upon a first previously determined or determinable differential pressure between the vehicle interior and the external atmosphere, and the at least one pressure relief valve of the second type opens upon a second previously determined or determinable differential pressure that differs from the first opening differential pressure between the vehicle interior and the external atmosphere.

This embodiment carries the advantage that the individual pressure relief valves can be adapted specifically to the expected pressure situations in the vehicle interior. For example, it is conceivable that a pressure relief valve is configured to equalize the positive pressure buildup in the vehicle cabin when operating an AC system, while the other pressure relief valve is only configured to equalize pressure spikes that occur, for example, when closing a door or tailgate of the vehicle.

Alternatively or additionally, it is also conceivable that the first pressure relief valve type differs from the second pressure relief valve type in that the at least one pressure relief valve of the first type closes upon a first previously determined or determinable differential pressure between the vehicle interior and the external atmosphere, and the at least one pressure relief valve of the second type closes upon a second previously determined or determinable differential pressure that differs from the first closing differential pressure between the vehicle interior and the external atmosphere.

In particular, the at least one pressure relief valve of the second type closes at a differential pressure between the vehicle interior and the external atmosphere higher than the first closing differential pressure for the at least one pressure relief valve of the first type. In other words, the at least one pressure relief valve of the second type preferably closes earlier than the at least one pressure relief valve of the first type.

In this embodiment, it is possible that only one type of the pressure relief valves remains open in order to equalize the positive pressure if there is only a low positive pressure in the vehicle interior, for example when operating an AC system.

According to implementations of the latter aspects, it is provided in particular that the first pressure relief valve type differs from the second pressure relief valve type in that the at least one pressure relief valve of the first type, in its fully opened state, allows for an airflow rate that is greater than an airflow rate that the at least one pressure relief valve of the second type allows in its fully open state.

Alternatively or additionally, it is also conceivable that the at least one pressure relief valve of the second type, in its fully open state, allows for an airflow rate that is greater than an airflow rate that the at least one pressure relief valve of the first type allows in its fully open state.

Alternatively or additionally, it is provided that the at least one pressure relief valve of the first type opens upon a first previously determined or determinable differential pressure between the vehicle interior and the external atmosphere, and the at least one pressure relief valve of the second type opens upon a second previously determined or determinable differential pressure between the vehicle interior and the external atmosphere, wherein the second previously determined or determinable aperture difference pressure value is greater than the first previously determined or determinable aperture difference pressure value.

It is likewise further conceivable that the at least one pressure relief valve of the first type closes at a first previously determined or determinable differential pressure between the vehicle interior and the external atmosphere, and the at least one pressure relief valve of the second type closes at a second previously determined or determinable differential pressure between the vehicle interior and the external atmosphere, wherein the second previously determined or determinable closing differential pressure value is greater than the first previously determined or determinable closing differential pressure value.

According to embodiments of the vehicle interior ventilation apparatus, it is provided that the first pressure relief valve type differs from the second pressure relief valve type in that the at least one pressure relief valve of the first type is receivable and/or fixable in a first receiving opening in a vehicle body component, and the at least one pressure relief valve of the second type is receivable and/or fixable in a second receiving opening in a vehicle body component, wherein the first receiving opening is different in particular and preferably in size and/or shape from the second receiving opening.

Thus, it is also conceivable that the at least one pressure relief valve of the first type is received or fixed in a receiving opening formed in a first vehicle body component or in a first outer skin component of the vehicle body, and that the at least one pressure relief valve of the second type is received or fixed in a receiving opening formed in a second vehicle body component or in a second outer skin component of the vehicle body, wherein the first vehicle body component or the first outer skin component is preferably different from the second vehicle body component and/or the second outer skin component.

According to implementations of this embodiment, it is provided that the second vehicle body component or the second outer skin component is a vehicle body component or outer skin component in which a vehicle door, in particular a sliding door, is accommodated or which adjoins a vehicle body component or outer skin component in which a vehicle door, in particular a sliding door, is accommodated.

On the other hand, in this embodiment, it is conceivable that the first vehicle body component or the first outer skin component in which the at least one pressure relief valve of the first type is integrated is a vehicle body component or outer skin component in a rear region of the vehicle, where there is typically sufficient space to hide a pressure relief valve, i.e., to make it not visible from the outside.

According to embodiments of the vehicle interior ventilation apparatus according to the present invention, it is provided that the first pressure relief valve type differs from the second pressure relief valve type in that the at least one pressure relief valve of the first type is of a design that differs from the design of the at least one pressure relief valve of the second type. By providing different designs for the pressure relief valves, different characteristics in the pressure balance can be realized.

In this context, in particular, it is provided that the design of the first pressure relief valve type differs from the design of the second pressure relief valve type in view of the closure type. According to implementations thereof, it is provided that the pressure relief valve of the first type has at least one check valve as a shut-off body, whereas the pressure relief valve of the second type is configured as a poppet or ball check valve. In particular, different response characteristics of the pressure relief valves are thus feasible.

According to embodiments of the latter aspect, it is provided that the at least one pressure relief valve of the first type is configured as a proportional valve, whose opening behavior is proportionate to the differential pressure between the vehicle interior and the external atmosphere between a range of a response differential pressure up to full opening. On the other hand, the pressure relief valve of the second type can preferably be configured as a full stroke valve, which opens suddenly and preferably with a full stroke upon response.

Of course, however, other embodiments are also considered here, in particular for the pressure relief valve of the second type.

The pressure relief valves of the vehicle interior ventilation apparatus according to the invention can also differ in that the at least one pressure relief valve of the first type is a weight-loaded, revolving spring-loaded, and/or gravity-loaded valve, while the at least one pressure relief valve of the second type is in particular a spring-loaded valve.

According to further developments of the vehicle interior ventilation apparatus according to the present invention, it is provided that only the at least one pressure relief valve of the first type is equipped with a type of "muffler." For example, a cover is placed on the pressure relief valve of the first type in order to form a muffler space, wherein, in the opened state of the pressure relief valve, a flow-like path between the vehicle interior and the outer atmosphere passes through the muffler space at least regionally.

More specifically, the invention thus relates to a vehicle interior ventilation apparatus, wherein, for example, the at least one pressure relief valve of the first type assumes the "classic" function of a ventilation valve, i.e., to equalize the positive pressure that builds up in the vehicle interior, for example when operating an AC system, while the at least one pressure relief valve of the second type assumes special tasks, in particular if a pressure build-up in the interior of the vehicle is abruptly generated, such as, in particular, when closing a sliding door, when closing a one-sided hinged side door or tailgate, or when an airbag is triggered.

This expands the functionality of the vehicle interior ventilation apparatus. As a result, it should further be mentioned that a door, in particular a sliding door, can be closed with a significantly lower closing force, which, in the case of electromotively operated doors, has the advantage that the corresponding electromotive actuators can be designed smaller for the door.

The invention further relates to a vehicle having a vehicle body formed from vehicle body components or outer skin components, said body at least partially or regionally enclosing or defining a vehicle interior, wherein the vehicle comprises a vehicle interior ventilation apparatus of the aforementioned nature, which is configured in order to equalize, as needed, a differential pressure between the vehicle interior and the outer atmosphere.

BRIEF DESCRIPTION OF THE DRAWINGS

The invention is described in further detail below with reference to the accompanying drawings.

The following are shown.

DETAILED DESCRIPTION

Figure 1:
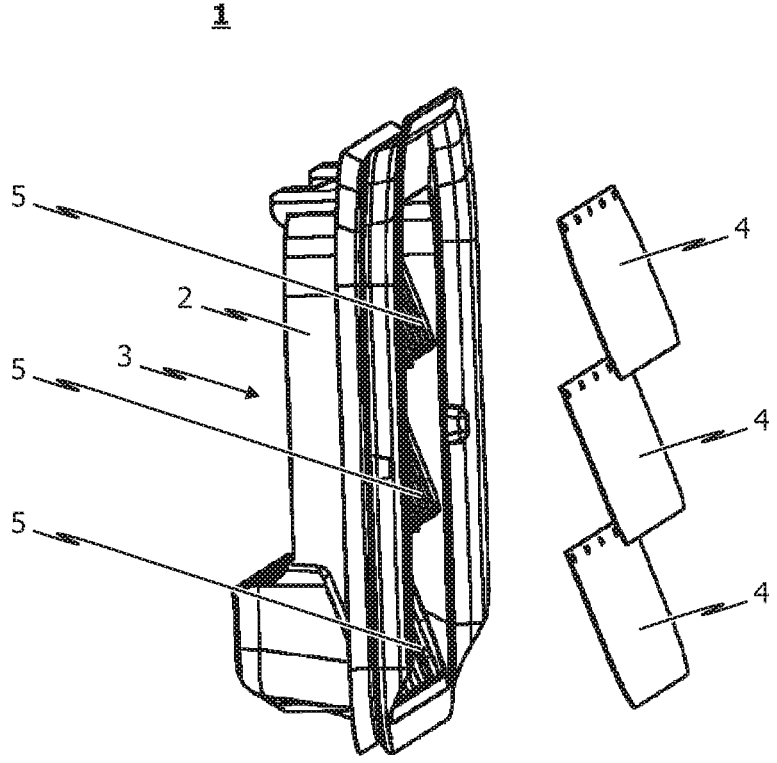
FIG. 1 shows schematically, and in an exploded view, an exemplary embodiment of a pressure relief valve of the first type for the vehicle interior ventilation apparatus according to the invention.

In particular, the present invention relates to a vehicle interior ventilation apparatus having at least one pressure relief valve 1 of a first type, as well as a pressure relief valve 10 of a second type that is different from the first type. The pressure relief valves 1, 10 of the different types are each received in different receiving openings in a vehicle body 100 and fixed accordingly. As can be seen in the accompanying drawings, the pressure relief valve of the first type differs from the pressure relief valve of the second type, in particular with respect to its design.

Referring to the illustrations in FIG. 1 through FIG. 2C, an exemplary embodiment of a pressure relief valve 1 of the first type will first be described.

The pressure relief valve 1 comprises a housing 2, in particular a frame housing, which defines an air inlet region and an opposite air outlet region. A housing wall of the housing 2 restricts a flow channel or air channel 3 between the air inlet region and the air outlet region. Through this flow channel or air channel 3, air can flow through the pressure relief valve 1 or through the housing 2 of the pressure relief valve 1 by entering via the air inlet region of pressure relief valve 1 and exiting via the air outlet region of the pressure relief valve 1.

The pressure relief valve 1 comprises at least one flap 4, in particular a valve flap, closing flap, or the like, which is movable or rotatable, in particular pivotable, about a first axis of rotation extending orthogonally to the main flow direction in the housing 2 of the pressure relief valve 1.

Three such flaps 4 are shown in the illustration in FIG. 1. However, fewer or more than three flaps 4 can also be used.

The at least one flap 4 of the pressure relief valve 1 of the first type is reversibly movable between an open position and a closed position. In a closed position, the at least one flap 4 contacts the housing 2 of the pressure relief valve 1 at least in regions. In particular, the at least one flap 4 contacts the housing 2 of the pressure relief valve 1 in a closed position on at least one abutment surface 5 against which the at least one flap 4 abuts in the closed position. According to one embodiment, the abutment surface 5 can also be configured circumferentially on the housing 2 of the pressure relief valve 1.

In the open position, the at least one flap 4 is oriented or arranged so as to release the flow channel or air channel 3 of the pressure relief valve 1 for the flowing air so that the air can flow through the pressure relief valve 1.

The pressure relief valve 1 is couplable or connectable via the housing 2 to a further component or element, for example to a vehicle body component 100. The pressure relief valve 1 can be received in a recess of such a wall via the housing 2.

Figure 2A:
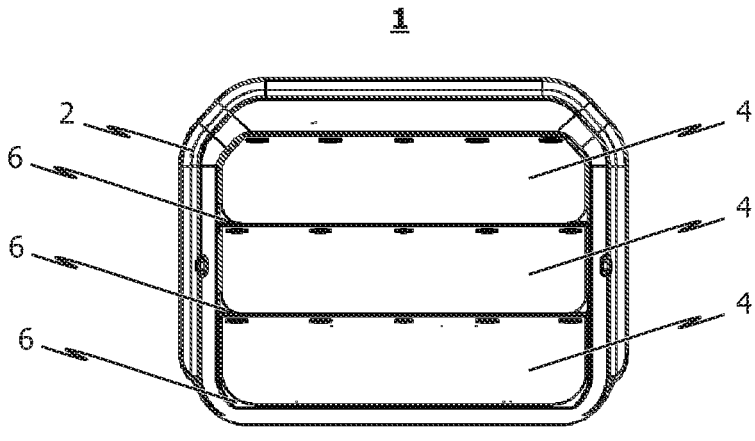
FIG. 2A shows schematically, and in a front view, the exemplary embodiment of the pressure relief valve according to FIG. 1.
Figure 2B:
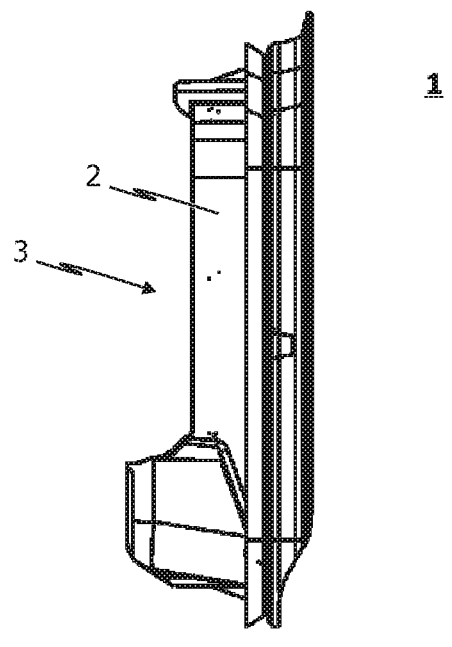
FIG. 2B shows schematically, and in a side view, the exemplary embodiment of the pressure relief valve according to FIG. 1.
Figure 2C:
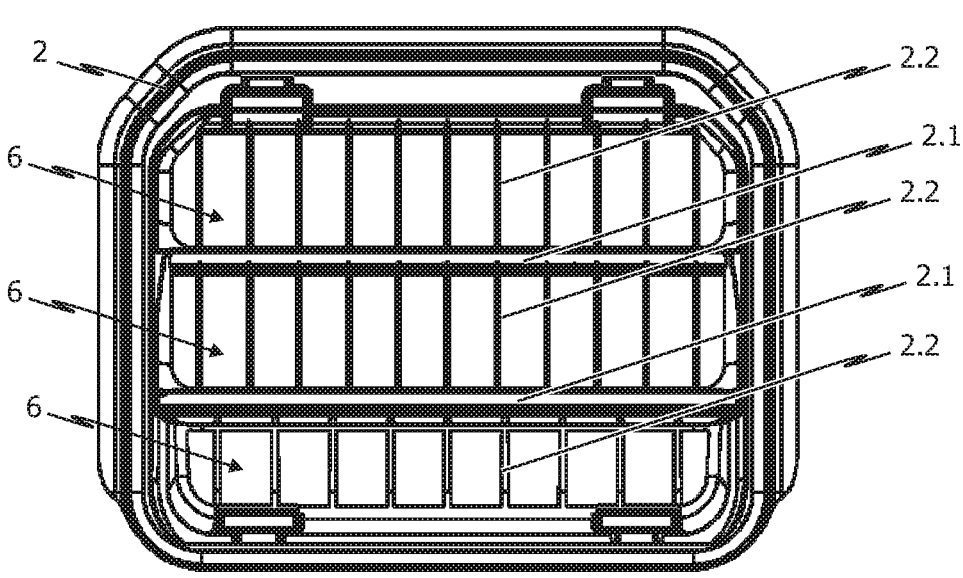
FIG. 2C shows schematically, and in a rear view, the exemplary embodiment of the pressure relief valve according to FIG. 1.

FIG. 2A to FIG. 2C show the pressure relief valve 1 of the first type according to FIG. 1 in three different views: in FIG. 2A, the pressure relief valve 1 is shown in a front view. The flow channel or air channel 3 of the pressure relief valve 1 is divided into at least one flow region, wherein each flow region is associated with a passage opening 6 for the airflow. The at least one passage opening 6 can be explicitly seen in FIG. 2C and is merely indicated in FIG. 2A, because it is obscured by the flap(s) 4.

Specifically, in the embodiment of the pressure relief valve 1 of the first type shown in FIG. 2A to FIG. 2C, three passage openings 6 are provided in the pressure relief valve 1. Each of these passage openings 6 is formed by a corresponding housing web 2.1 (see FIG. 2C).

However, it is also possible that the pressure relief valve 1 is equipped with only one passage opening 6. It is also conceivable that the pressure relief valve 1 comprises more than one or three passage openings 6.

Each of these openings 6 can be associated with at least one flap 4, so that each of the passage openings 6 can be closed or opened by its own flap 4.

FIG. 2B is a side view of the exemplary embodiment of the pressure relief valve 1 of the first type. It can be seen in this illustration that the housing 2 of the pressure relief valve 1 can have a special external geometry so that the pressure relief valve 1 or the housing 2 of the pressure relief valve 1 can be received in a corresponding recess, for example of a vehicle body component 100.

FIG. 2C shows the exemplary embodiment of the pressure relief valve 1 of the first type from a rear view. In this illustration, the housing webs 2.1 can be clearly recognized, which on the one hand provide for the formation of the various passage openings 6 and on the other hand simultaneously form the abutment surfaces 5 for the flaps 4. The main direction of extension of the housing webs 2.1 is orthogonal to the main flow direction of the air.

The housing webs 2.1 of the pressure relief valve 1 can have additional housing ribs 2.2 arranged orthogonally to a main extension direction of the housing webs 2.1. These additional housing ribs 2.2 provide for a further division of the passage openings 6 into sub-openings.

The housing webs 2.1 and the additionally provided housing ribs 2.2 also provide an additional stiffening of the housing 2 of the pressure relief valve 1, such that it cannot be undesirably deformed, for example during assembly. The housing webs 2.1 and the housing ribs 2.2 are integrally formed with the housing 2 of the pressure relief valve 1.

Further, by using housing ribs 2.2 in the pressure relief valve 1, the additional advantage can be achieved that small animals, such as mice or the like, are prevented from entering the passenger compartment or into regions between a vehicle outer shell and the passenger compartment via the pressure relief valve 1.

Referring now to the illustrations in FIG. 3 to FIG. 9, exemplary embodiments of a pressure relief valve 10 of a second type will be described. It is readily apparent that the pressure relief valves 10 of the second type differ from the previously described pressure relief valve 1 of the first type in terms of design and operation.

The exemplary embodiments of the pressure relief valve 10 of the second type shown in FIG. 3 to FIG. 9 are configured as poppet check valves, wherein a spring 15 provides for the blocking of the valve 10. The sealing body is in the form of a level, in particular circular, plate or poppet (poppet valve 11), wherein, of course, other designs for the valve plate are conceivable. A bolt or pin 20 is used for guiding.

Figure 3:
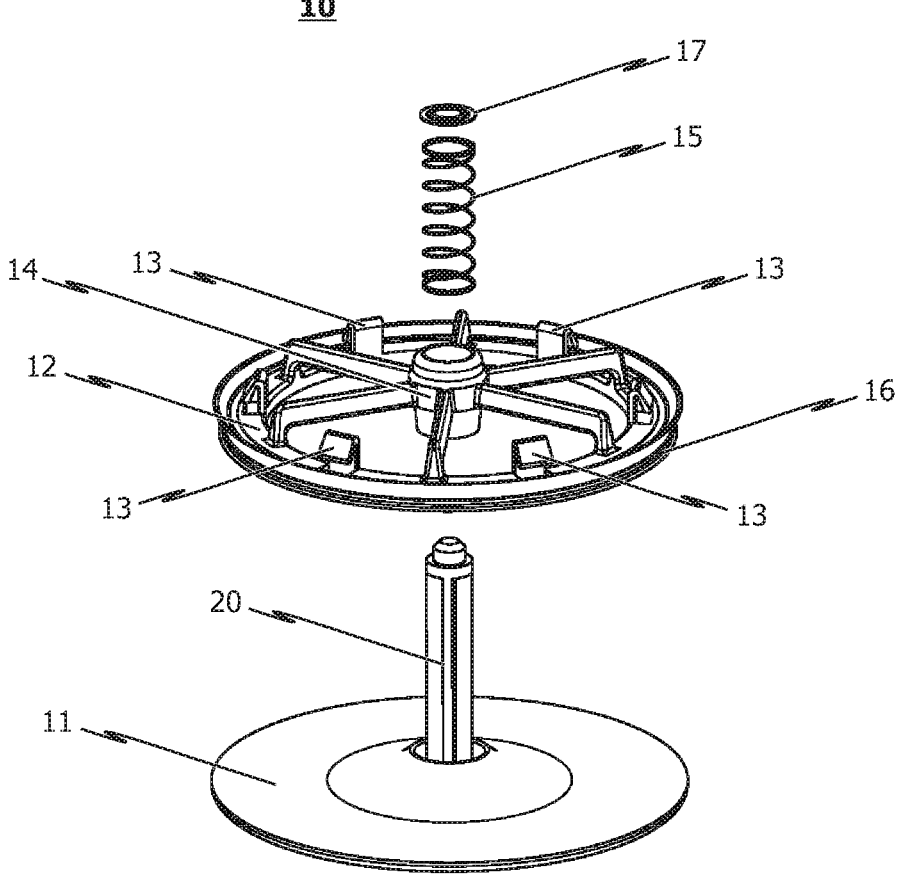
FIG. 3 shows schematically, and in an exploded view, a first exemplary embodiment of a pressure relief valve of the second type for the vehicle interior ventilation apparatus according to the invention.
Figure 4:
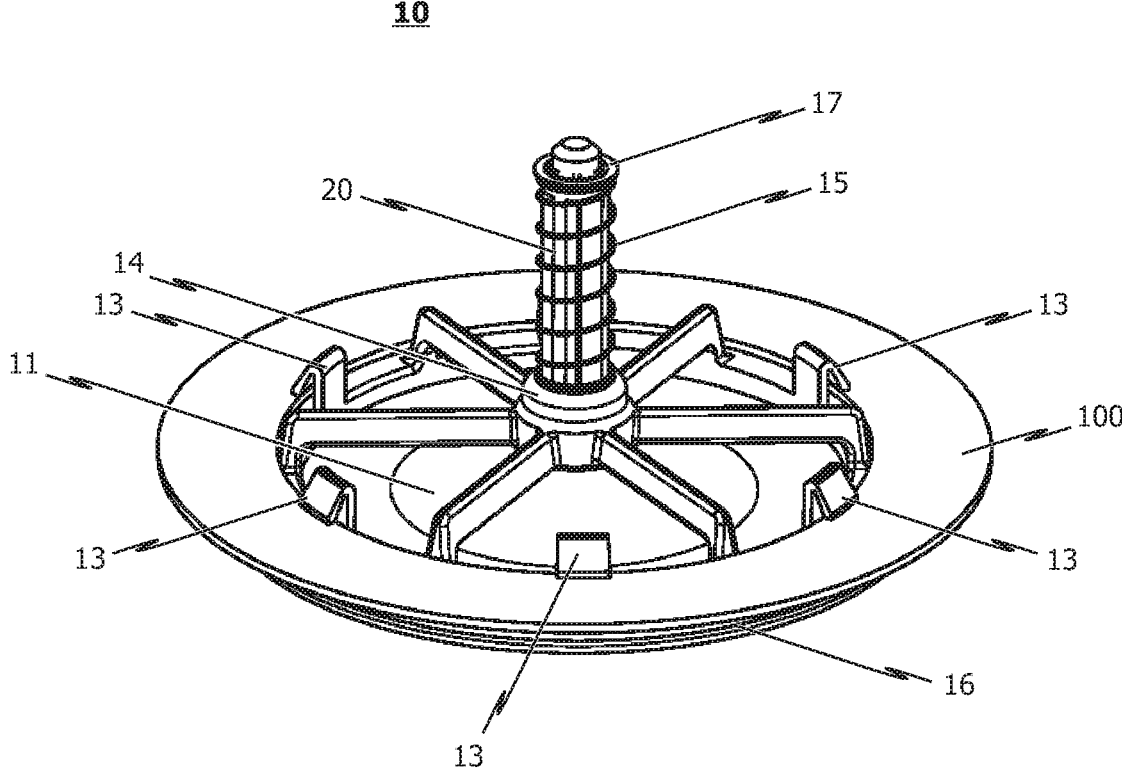
FIG. 4 shows schematically, and in an isometric view, the example embodiment of the pressure relief valve according to FIG. 3.

Specifically, and as can be seen in particular from the exploded view in FIG. 3, the bolt or pin 20 is connected centrally to the valve plate 11 and stands at 900 to the longitudinal extension of the poppet valve 11.

In the assembled state of the pressure relief valve 10, the bolt or pin 20 passes through a sleeve-shaped element 14 of the valve frame 12 and then receives the compression spring or spiral spring 15. At the upper end region of the bolt 20, a thickening or fixation is provided so as to prevent the spring 15 received by the bolt 20 from being removed.

Figure 7:
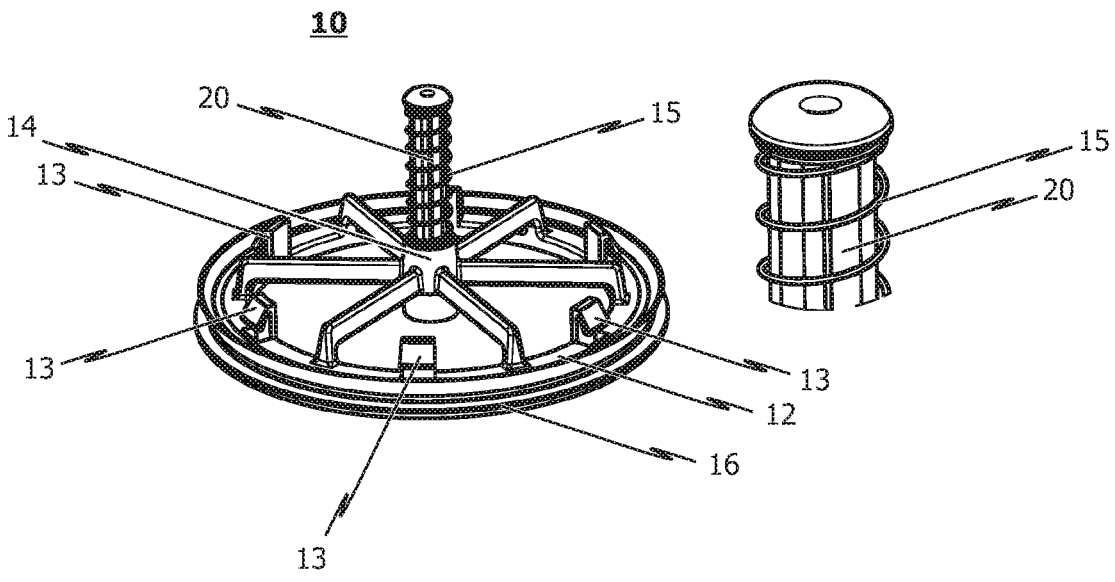
FIG. 7 shows schematically, and in isometric views, a further exemplary embodiment of the pressure relief valve of the second type for the vehicle interior ventilation apparatus according to the invention.
Figure 8:
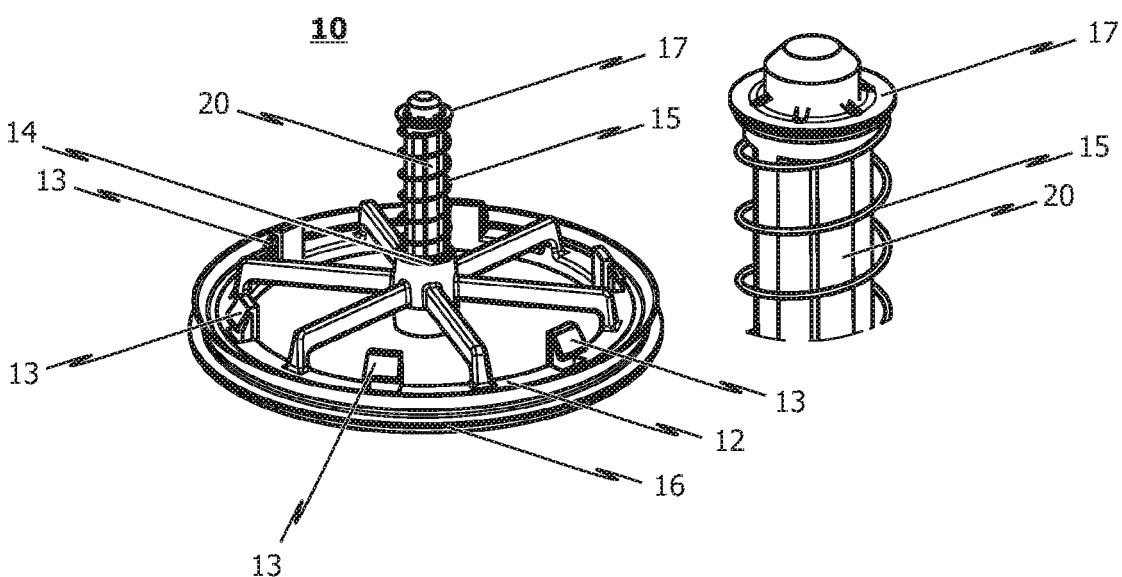
FIG. 8 shows schematically, and in isometric views, a further exemplary embodiment of the pressure relief valve of the second type for the vehicle interior ventilation apparatus according to the invention.
Figure 9:
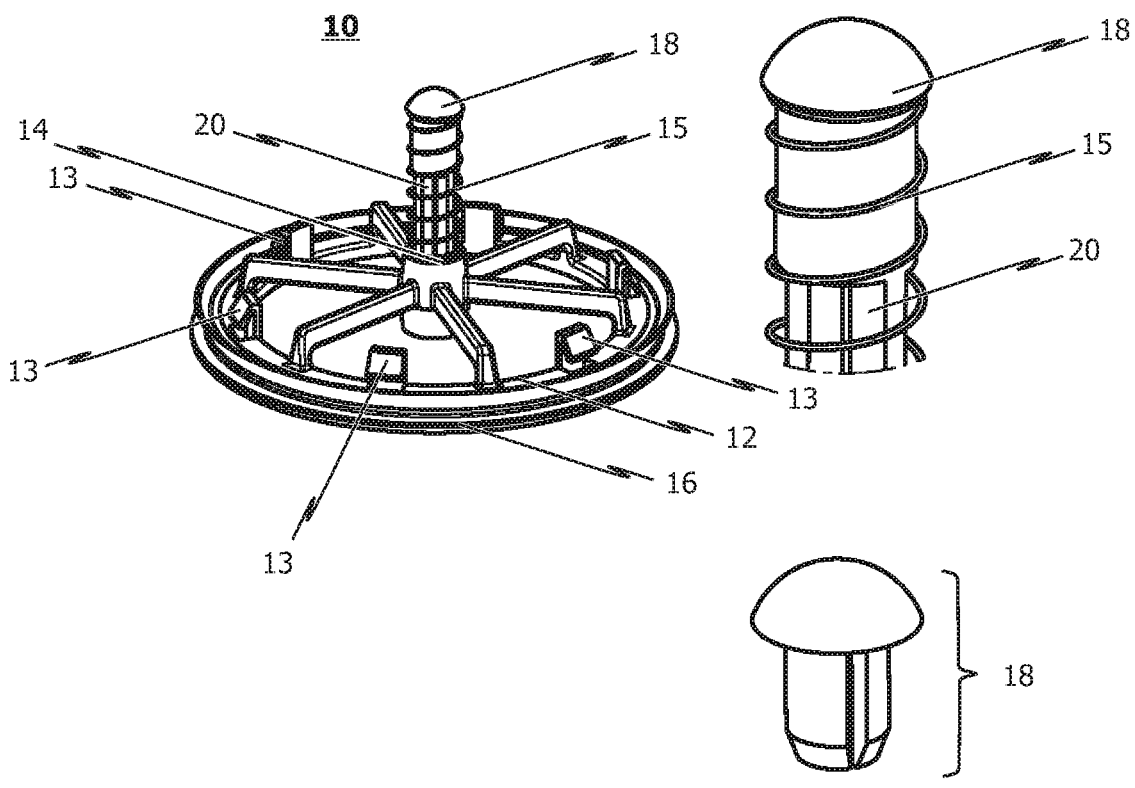
FIG. 9 shows schematically, and in a further isometric view, the exemplary embodiment of the pressure relief valve for the vehicle interior ventilation apparatus according to the invention.

For this purpose—as shown in FIG. 7, FIG. 8, and FIG. 9—various solutions can be considered. In the exemplary embodiment shown in FIG. 7, at the upper end region of the bolt 20, a protrusion is integrally connected to the bolt 20, for example, by adhesive bonding or welding.

According to the embodiment shown in FIG. 8, a clamping ring 17 can also be used for fixation.

According to the illustration in FIG. 9, a countersunk grooved pin 18 or the like can also be used. A retracting catching function for holding the spiral spring by means of an anchor foot is also conceivable.

The valve frame 12 has catching elements 13 distributed over its outer periphery in the form of catching tabs that serve to fix the valve frame 12 to an opening of a vehicle body component 100.

Figure 5A:
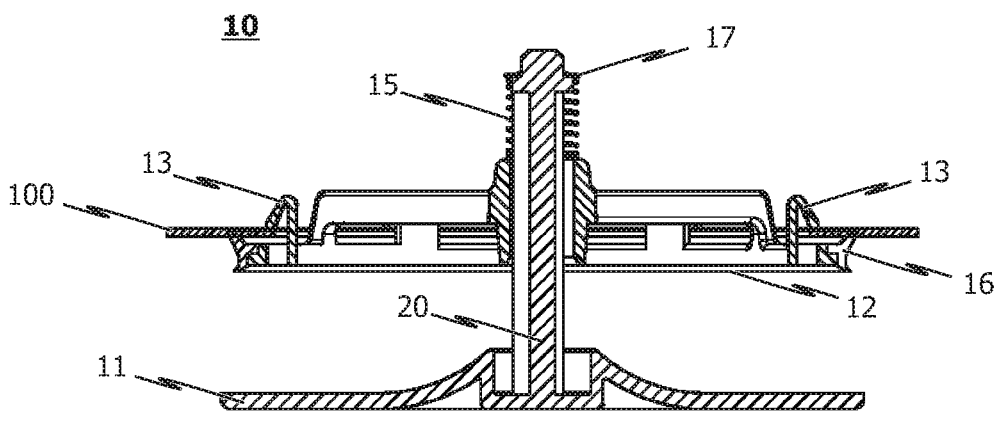
FIG. 5A shows schematically, and in a sectional view, the exemplary embodiment of the pressure relief valve according to FIG. 3 in an opened state.
Figure 5B:
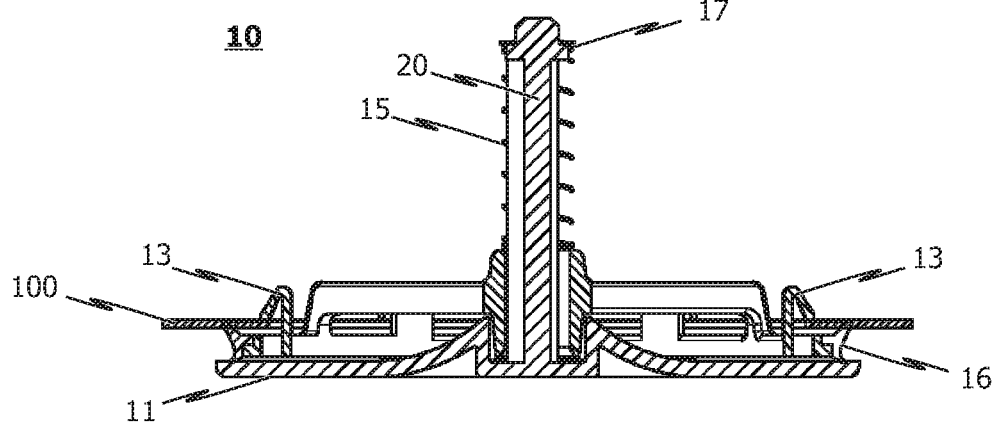
FIG. 5B shows schematically, and in a sectional view, the exemplary embodiment of the pressure relief valve according to FIG. 3 in a closed state.
Figure 6A:
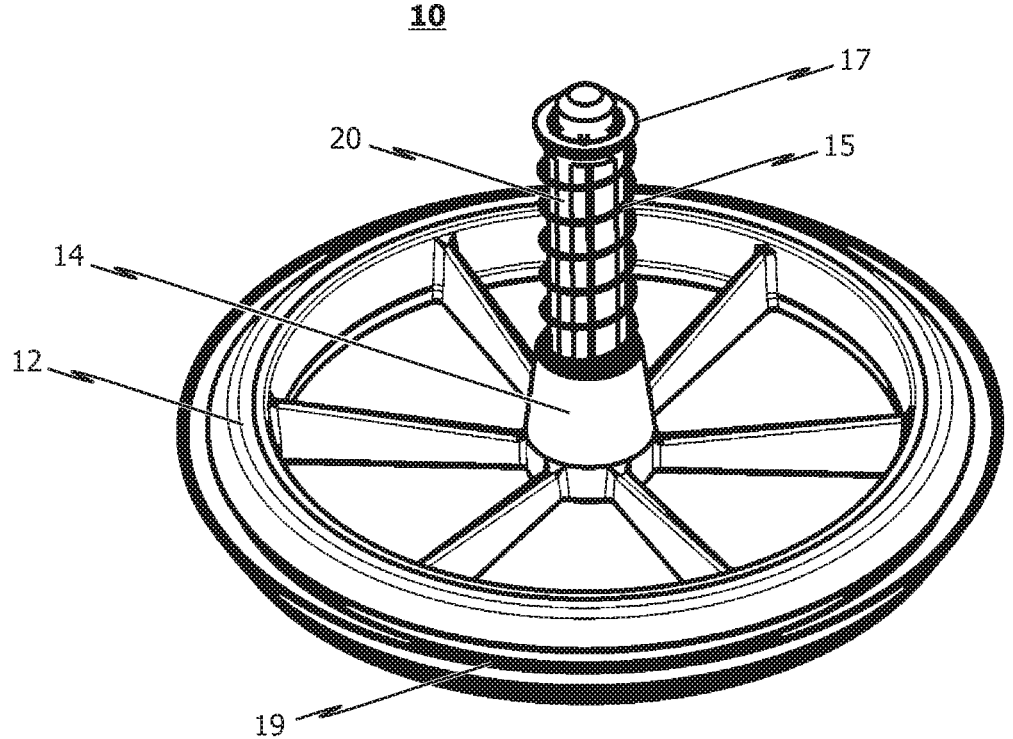
FIG. 6A shows schematically, and in an isometric view, a second exemplary embodiment of a pressure relief valve of the second type for the vehicle interior ventilation apparatus according to the invention.
Figure 6B:
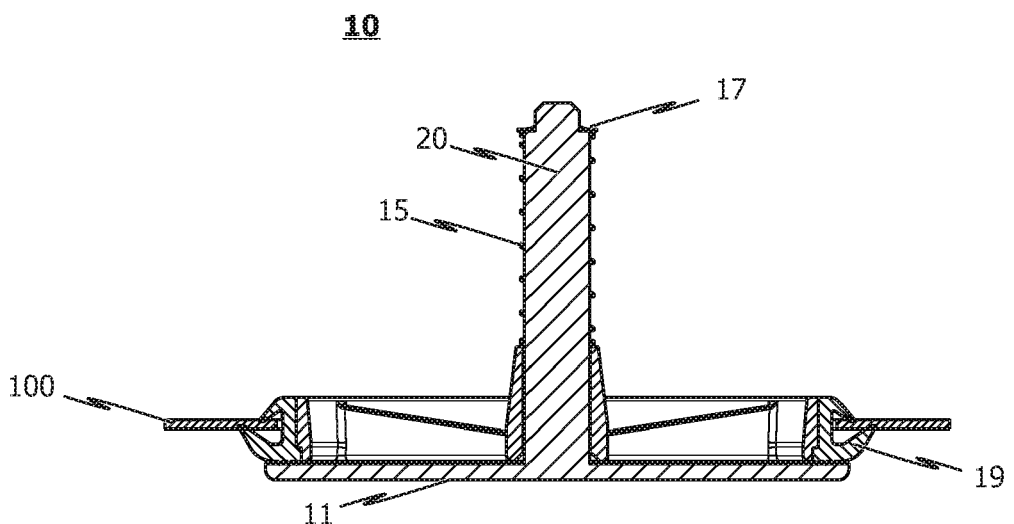
FIG. 6B shows schematically, and in a sectional view, the second exemplary embodiment of the pressure relief valve according to FIG. 6A in an installed and closed state.

Specifically, and as can be seen in particular from the sectional views in FIG. 5A and FIG. 6B, the catching elements 13 pass through the opening of the body component 100 and thus abut the periphery of the opening in the vehicle body component 100.

The valve frame 12 further includes a seal 16 surrounding the valve frame 12, which circumferentially seals the opening in the vehicle body component in the assembled state of the pressure relief valve 10, and in particular serves to seal the poppet valve 11 when closed.

The valve frame 12 is preferably injection-molded from a plastic material. The seal 16 is also made of a plastic material and can be formed together with the valve frame 12 in a 2K injection molding process.

Figure 6C:
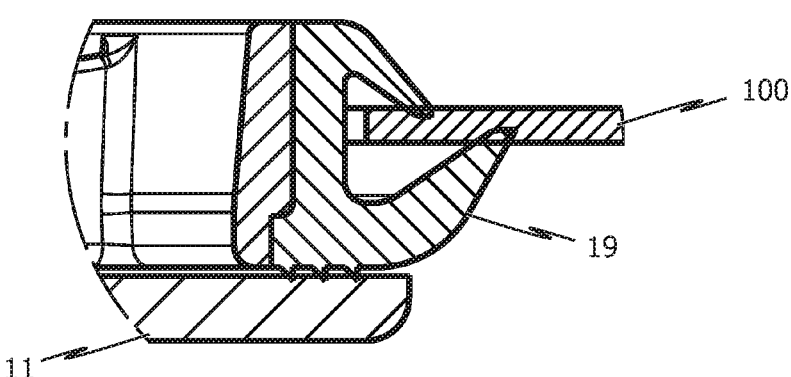
FIG. 6C shows schematically, an excerpt from FIG. 6B.

In FIGS. 6A to 6C, a variant of the pressure relief valve 10 of the second type is shown. This embodiment differs in particular from the embodiment shown in FIG. 3, FIG. 4, and FIG. 5A to FIG. 5B with respect to the seal 16 surrounding the valve frame 12. Specifically, a double-lip seal 19 formed in a 2K injection molding process, preferably in conjunction with the valve frame 12, is used, between which the peripheral region of the receiving opening of the vehicle body component 100 is received. The double-lip seal 19 is thus used in order to fix the pressure relief valve 10 and to provide a sealing effect.

Based on the exemplary embodiments of the pressure relief valves 1, 10 shown in the drawings, it can be seen that the pressure relief valve 1 of the first type (FIG. 1 and FIG. 2) differs from the pressure relief valve 10 of the second type (FIG. 3 to FIG. 9) with regard to the design, and in particular with regard to the type of closure, as a result of which the pressure relief valves 1, 10 of the different types have different responsiveness and different airflow rates, as well as different critical opening pressures and closing pressures.

The invention is not limited to the embodiments shown in the drawings, but results when all of the features disclosed herein are considered together.

LIST OF REFERENCE NUMERALS

1 Pressure relief valve of the first type
2 Housing

2.1 Housing web
2.2 Housing rib
3 Flow channel or air channel
4 Flap 4, in particular valve flap or closing flap
5 Abutment surface
6 Passage opening
10 Pressure relief valve of the second type
11 Poppet valve
12 Valve frame
13 Catching element
14 Sleeve-shaped element
15 Compression spring/spiral spring
16 Gasket
17 Clamping ring/clamping washer/lock washer
18 Countersunk grooved pin
19 Double-lip seal
20 Bolt/pin
100 Vehicle body component

The invention claimed is:

1. A vehicle interior ventilation apparatus having at least one pressure relief valve, of a first type, which is received and/or fixed in a first receiving opening in a vehicle body component and is arranged to allow an airflow from an interior of the vehicle to pass outwardly from the interior of the vehicle via the vent opening, and having at least one pressure relief valve, of a second type that differs from the first type, which is received and/or fixed in a second receiving opening separated from the first receiving opening in a vehicle body component and is arranged to allow an airflow from an interior of the vehicle to pass outwardly from the interior of the vehicle via the vent opening, wherein the valve of the first type is a pivoting flap type valve and the valve of the second type is poppet or ball check valve.

2. The vehicle interior ventilation apparatus according to claim 1, wherein (i) the at least one pressure relief valve of the first type, in its fully opened state, allows for an airflow rate that differs from an airflow rate that the at least one pressure relief valve of the second type allows in its fully open state; and/or (ii) the at least one pressure relief valve of the first type opens upon a first previously determined or determinable differential pressure between the vehicle interior and the external atmosphere, and the at least one pressure relief valve of the second type opens upon a second previously determined or determinable differential pressure that differs from the first opening differential pressure between the vehicle interior and the external atmosphere; and/or (iii) the at least one pressure relief valve of the first type closes upon a first previously determined or determinable differential pressure between the vehicle interior and the external atmosphere, and the at least one pressure relief valve of the second type closes upon a second previously determined or determinable differential pressure that differs from the first closing differential pressure between the vehicle interior and the external atmosphere.

3. The vehicle interior ventilation apparatus according to claim 1, wherein the at least one pressure relief valve of the first type, in its fully open state, allows for an airflow rate that is greater than an airflow rate that the at least one pressure relief valve of the second type allows in its fully open state; and/or the at least one pressure relief valve of the second type, in its fully open state, allows for an airflow rate that is greater than an airflow rate that the at least one pressure relief valve of the first type allows in its fully open state; and/or the at least one pressure relief valve of the first type opens upon a first previously determined or determinable differential pressure between the vehicle interior and the external atmosphere, and the at least one pressure relief valve of the second type opens upon a second previously determined or determinable differential pressure between the vehicle interior and the external atmosphere, wherein the second previously determined or determinable aperture difference pressure value is greater than the first previously determined or determinable aperture difference pressure value; and/or the at least one pressure relief valve of the first type closes at a first previously determined or determinable differential pressure between the vehicle interior and the external atmosphere, and the at least one pressure relief valve of the second type closes at a second previously determined or determinable differential pressure between the vehicle interior and the external atmosphere, wherein the second previously determined or determinable closing differential pressure value is greater than the first previously determined or determinable closing differential pressure value.

4. The vehicle interior ventilation apparatus according to claim 1, wherein the at least one pressure relief valve of the first type is receivable and/or fixable in a first receiving opening in a vehicle body component, and the at least one pressure relief valve of the second type is receivable and/or fixable in a second receiving opening in a vehicle body component, wherein the first receiving opening is different in size and/or shape from the second receiving opening.

5. The vehicle interior ventilation apparatus according to claim 1, wherein the at least one pressure relief valve of the first type is received and/or fixed in a receiving opening formed in a first vehicle body component or in a first outer skin component of the vehicle body, and wherein the at least one pressure relief valve of the second type is received and/or fixed in a receiving opening formed in a second vehicle body component or in a second outer skin component of the vehicle body, wherein the first vehicle body component or the first outer skin component differs from the second vehicle body component and/or the second outer skin component.

6. The vehicle interior ventilation apparatus according to claim 5, wherein the second vehicle body component or the second outer skin component is (i) a vehicle body component or outer skin component in which a vehicle door is accommodated; or (ii) adjoining the vehicle body component or outer skin component in which the vehicle door is accommodated.

7. The vehicle interior ventilation apparatus according to claim 5, wherein the first vehicle body component or the first outer skin component is a vehicle body component or outer skin component in a rear region of the vehicle.

8. The vehicle interior ventilation apparatus according to claim 1, wherein the at least one pressure relief valve of the first type has a response behavior that differs from the response behavior of the at least one pressure relief valve of the second type.

9. The vehicle interior ventilation apparatus according to claim 8, wherein the at least one pressure relief valve of the first type is configured as a proportional valve, whose opening behavior is proportionate or at least substantially proportionate to the differential pressure between the vehicle interior and the external atmosphere between a range of a response differential pressure up to full opening, and wherein the at least one pressure relief valve of the second type is configured as a full stroke valve, which opens suddenly and with a full stroke upon response.

10. The vehicle interior ventilation apparatus according to claim 1, wherein the at least one pressure relief valve of the first type is a weight-loaded, revolving spring-loaded, and/or gravity-loaded valve, and the at least one pressure relief valve of the second type is a spring-loaded valve.

11. The vehicle interior ventilation apparatus according to claim 1, wherein only the at least one pressure relief valve of the first type is provided with a cover forming a muffler space.

12. A vehicle having a vehicle body formed from vehicle body components or outer skin components, said body at least partially or regionally enclosing or defining the vehicle interior, and having the vehicle interior ventilation apparatus according to claim 1, which is configured in order to equalize, as needed, a differential pressure between the vehicle interior and the outer atmosphere.

13. A vehicle interior ventilation apparatus having at least one pressure relief valve, of a first type, which is received and/or fixed in a first receiving opening in a vehicle body component and is arranged to allow an airflow from an interior of the vehicle to pass outwardly from the interior of the vehicle via the vent opening, and having at least one pressure relief valve, of a second type that differs from the first type, which is received and/or fixed in a second receiving opening separated from the first receiving opening in a vehicle body component and is arranged to allow an airflow from an interior of the vehicle to pass outwardly from the interior of the vehicle via the vent opening, wherein the at least one pressure relief valve of the first type has a response behavior that differs from a response behavior of the at least one pressure relief valve of the second type, wherein the at least one pressure relief valve of the first type is configured as a proportional valve, whose opening behavior is proportionate or at least substantially proportionate to the differential pressure between the vehicle interior and the external atmosphere between a range of a response differential pressure up to full opening, and wherein the at least one pressure relief valve of the second type is configured as a full stroke valve, which opens suddenly and with a full stroke upon response.

14. A vehicle interior ventilation apparatus having at least one pressure relief valve, of a first type, which is received and/or fixed in a first receiving opening in a vehicle body component and is arranged to allow an airflow from an interior of the vehicle to pass outwardly from the interior of the vehicle via the vent opening, and having at least one pressure relief valve, of a second type that differs from the first type, which is received and/or fixed in a second receiving opening separated from the first receiving opening in a vehicle body component and is arranged to allow an airflow from an interior of the vehicle to pass outwardly from the interior of the vehicle via the vent opening, wherein only the at least one pressure relief valve of the first type is provided with a cover forming a muffler space.

15. The vehicle interior ventilation apparatus according to claim 14, wherein the at least one pressure relief valve of the first type has a design that differs from the design of the at least one pressure relief valve of the second type.

16. The vehicle interior ventilation apparatus according to claim 15, wherein the design of the first pressure relief valve type differs from the design of the second pressure relief valve type in view of the closure type.

17. The vehicle interior ventilation apparatus according to claim 15, wherein the at least one pressure relief valve of the first type has at least one check valve as a shut-off body, and wherein the at least one pressure relief valve of the second type is configured as a poppet or ball check valve.

\* \* \* \* \*